(12) United States Patent
Wang et al.

(10) Patent No.: US 7,685,331 B2
(45) Date of Patent: Mar. 23, 2010

(54) DIRECT MEMORY ACCESS CONTROLLER

(75) Inventors: Jun Wang, Beijing (CN); Chuanen Jin, Beijing (CN)

(73) Assignee: Vimicro Corporation, Beijing (CN)

( * ) Notice: Subject to any disclaimer, the term of this patent is extended or adjusted under 35 U.S.C. 154(b) by 231 days.

(21) Appl. No.: 11/614,085

(22) Filed: Dec. 21, 2006

(65) Prior Publication Data

US 2007/0162649 A1 Jul. 12, 2007

(30) Foreign Application Priority Data

Dec. 22, 2005 (CN) .......................... 2005 1 0132222

(51) Int. Cl.
*G06F 13/28* (2006.01)
*G06F 3/00* (2006.01)
*G06F 13/12* (2006.01)

(52) U.S. Cl. ............................... 710/22; 710/30; 710/62

(58) Field of Classification Search ...................... 710/22
See application file for complete search history.

(56) References Cited

U.S. PATENT DOCUMENTS 6,771,655 B1 * 8/2004 O'Loughlin et al. ........ 370/449
7,287,114 B2 * 10/2007 Sullivan ...................... 710/316
7,350,049 B1 * 3/2008 Li et al. ....................... 711/170
7,609,688 B2 * 10/2009 Dittmar ....................... 370/364
2002/0161941 A1 * 10/2002 Chue et al. .................... 710/22

* cited by examiner

*Primary Examiner*—Niketa I Patel
*Assistant Examiner*—Zachary K Huson
(74) *Attorney, Agent, or Firm*—Wuxi Sino-US IP Agency, Ltd; Joe Zheng

(57) ABSTRACT

A direct memory access controller (DMAC) is disclosed. In one case, the DMAC is configured to manage a DMA transmission of mass data with non-continuous addresses with a nonvolatile memory. The DMAC has to transmit them in batches according to their respective continuous addresses but, different from the prior art systems, does not interrupt a CPU for each batch of the DMA transmissions. In a DMA transmission between a functional device and the nonvolatile memory, a central processor configures a link-list of cluster addresses, which is obtained from a FAT (i.e., a file allocated table) in the nonvolatile memory and may be non-continuous, in a logic address buffer. Then, a divide unit provided in the DMAC divides a non-continuous link-list of cluster addresses from the logic address buffer into a plurality of continuous sub-link-list of cluster addresses, thus the DMAC can configure each batch of DMA transmission according to the continuous sub-link-list of cluster addresses without causing impact on the CPU.

9 Claims, 4 Drawing Sheets

DIRECT MEMORY ACCESS CONTROLLER

BACKGROUND OF THE INVENTION

1. Field of the Invention

The present invention relates to the area of data transmission between a source device and a destination device, and more particularly to data transmission between the source device and the destination device via a direct memory access controller with minimum impact on the CPU.

2. Description of Related Art

Direct memory access (DMA) is a feature of modern computers, that allows certain hardware subsystems within the computer to access system memory for reading and/or writing independently of the central processing unit. Many hardware systems use DMA including disk drive controllers, graphics cards, network cards, and sound cards. Computers that have DMA channels can transfer data to and from devices with much less CPU overhead than computers without a DMA channel. However, the DMAC can only transmit data with continuous addresses at one time. For the mass data without continuous addresses, a Direct Memory Access Controller (DMAC) has to transmit them in batches according to their respective continuous addresses and requires to be reconfigured by the CPU during each batch of the DMA transmission. In other words, the DMAC has to repeatedly interrupt the CPU's execution on other tasks to get continuation address in the DMA transmission, thus adding additional burdens to the CPU.

Additionally, there will be a plurality of functional devices to request the DMAC for the DMA transmissions each of which corresponds to a DMAC channel. The CPU has to be interrupted to switch among different DMA channels. If the switch between the different DMA channels is high frequently, it would further add additional burdens to the CPU.

Thus, there is a need for techniques for transmitting data more efficiently via the DMAC with minimum impact on a CPU.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to a direct memory access controller (DMAC), an architecture thereof and the method of doing the same. According to one aspect of the present invention, when there is a DMA transmission of mass data with non-continuous addresses with a nonvolatile memory, a DMAC has to transmit them in batches according to their respective continuous addresses. Different from the DMAC in a prior art system, the DMAC in the present invention does not interrupt a CPU for each batch of the DMA transmissions. According to one embodiment, in a DMA transmission between a functional device and the nonvolatile memory, a central processor configures a link-list of cluster addresses, which is obtained from a FAT (i.e., a file allocated table) in the nonvolatile memory and may be non-continuous, in a logic address buffer. Then, a divide unit provided in the DMAC divides a non-continuous link-list of cluster addresses from the logic address buffer into a plurality of continuous sub-link-list of cluster addresses, thus the DMAC can configure each batch of DMA transmission according to the continuous sub-link-list of cluster addresses without causing impact on the CPU.

According to another aspect of the present invention, when multiple devices require respective DMA transmissions with a nonvolatile memory in a device or system, the DMAC is configured to handle the respective DMA transmissions with minimum impact on the CPU. In one embodiment, a FAT accelerator obtains corresponding link-lists of cluster addresses from the FAT in the nonvolatile memory and stores the link-lists in corresponding sections in a logic address buffer 14. A divide unit in the DMAC divides each of the link-lists into a plurality of continuous sub-link-lists of cluster addresses, a length of which is less than a maximum allowed (cluster) number for a corresponding DMA channel. Hence, if a length is indeed longer than the maximum allowed number, such a long DMA transmission will be divided into a number of short sub-DMA transmissions. When a sub-DMA transmission corresponding to one DMA channel finishes, a sub-DMA transmission corresponding to another DAM channel starts, so that the sub-DMA transmissions of one DMA channels may be alternatively finished with the sub-DMA transmissions of other DMA channels. Thus, the DMAC is time division multiplexing by the DMA channels corresponding to the functional devices.

The present invention may be implemented in various ways including an apparatus or a system. According to one embodiment, the present invention is a direct memory access (DMA) controller for transmitting data between a first device and a second device, the DMA controller comprises: an interface for communicating with the first device; an interface for communicating with the second device; a logic address buffer for buffering data addresses of DMA transmission; a divide unit for obtaining the data addresses from the logic address buffer and dividing the data addresses into groups of continuous data addresses, each of the groups for one part of the DMA transmission; and a central unit for configuring and controlling the DMA transmission according to the groups of continuous data addresses in an order until the DMA transmission finishes. In operation, a nonvolatile memory serves as the first device in a reading DMA transmission, and the second device in a writing DMA transmission.

According to another embodiment, the present invention is a direct memory access (DMA) controller for transmitting data between a first device and a second device, the DMA controller comprises: a direct memory access (DMA) controller for transmitting data between a first device and a second device, the DMA controller comprising: a central processor; a logic address buffer caching a link-list of cluster addresses obtained from a file allocated table (FAT) in a nonvolatile memory; a divide unit dividing the link-list of cluster addresses into a plurality of continuous sub-link-lists of cluster addresses; and wherein the central processor is caused to configure a DMA transmission between the first and second devices into a number of batches of sub-DMA transmissions, each of the batches corresponding to one of the sub-link-lists of cluster addresses, as a result, the batches of sub DMA transmissions according to the continuous sub-link-lists of cluster addresses proceed without causing impact on a CPU in the source device.

According to still another embodiment, the present invention is a direct memory access (DMA) controller for transmitting data between a first device and a second device, the DMA controller comprises: an interface to communicate with a FAT accelerator to obtain corresponding link-lists of cluster addresses from a FAT in a nonvolatile memory; a logic address buffer for storing the link-lists in corresponding sections; and a divide unit dividing each of the link-lists into a plurality of continuous sub-link-lists of cluster addresses, a length of which is less than a maximum allowed number for a corresponding DMA channel, wherein, if a length is indeed longer than the maximum allowed number, a long DMA transmission is divided into a number of sub-DMA transmissions. When a sub-DMA transmission corresponding to one DAM channel finishes, a sub-DMA transmission corresponding to another DAM channel starts, so that the sub-DMA transmissions of one DMA channels is alternatively finished with the sub-DMA transmissions of other DMA channels.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Figure 1:
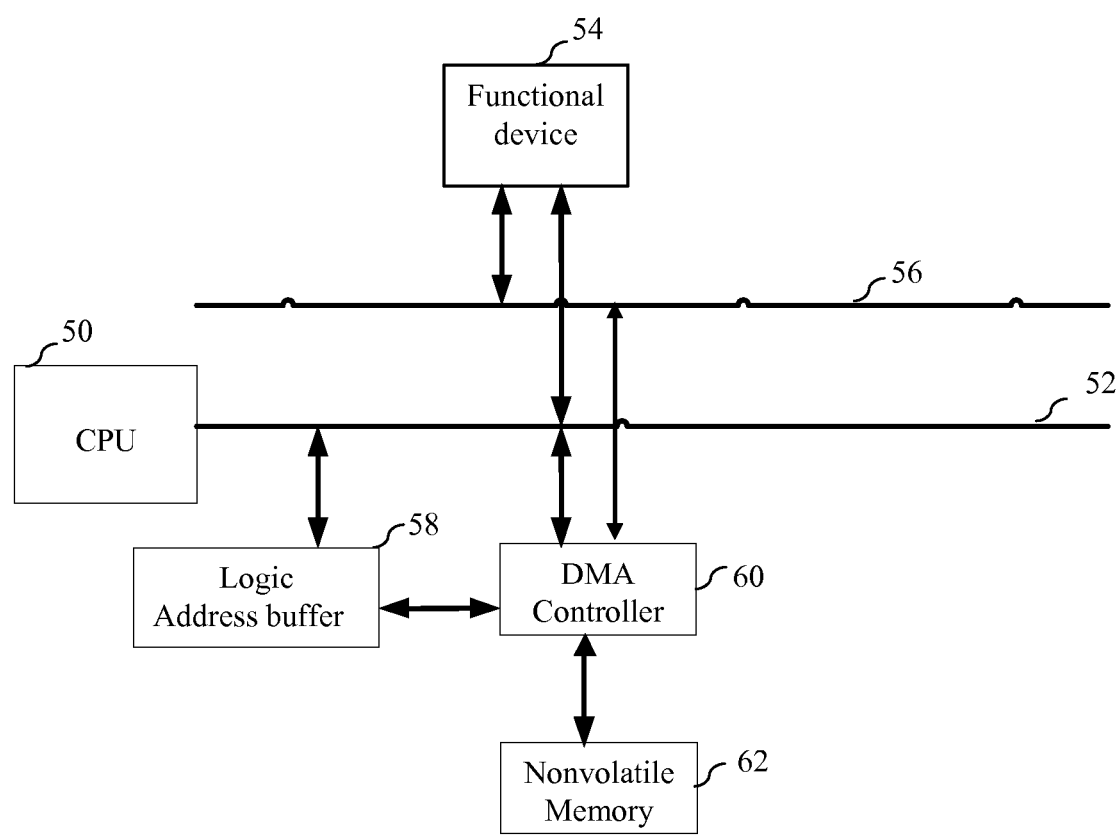
FIG. 1 is one exemplary application system of a direct memory access controller (DMAC) according to one embodiment of the present invention.

As shown in FIG. 1, which is one exemplary application system of direct memory access controller (DMAC) according to one embodiment of the present invention, the application system comprises a center processor unit (CPU) 50 coupled to a data bus 52, a functional device 54, such as a MP3 player or WMA player, coupled to the data bus 52 and a DMA bus 56, a logic address buffer 58 coupled to the data bus 52 a DMAC 60 and a nonvolatile memory 62 coupled to the DMAC 60. After an interrupt request for accessing the nonvolatile memory 62 from the functional device 54 is received, the DMA bus 56 may be granted to the functional device 54. Thereby, a DMA channel is established between the functional device 54 and the nonvolatile memory 62, and then a DMA transmission can start through the DMA channel controlled by the DMAC 60.

Generally, the functional device 54 may request the DMA transmission for mass data with non-continuous addresses in the nonvolatile memory 62, the DMAC 60 has to transmit them in batches according to their respective continuous addresses. Different from the DMAC in a prior art system, it is not necessary for the DMAC 60 to interrupt the CPU 50 for each batch of the DMA transmissions. According to one embodiment, in a DMA transmission between the functional device 54 and the nonvolatile memory 62, the CPU 50 configures a link-list of cluster addresses, which is obtained from a FAT (i.e., a file allocated table) in the nonvolatile memory 62 and may be non-continuous, in the logic address buffer 58. Then, a divide unit provided in the DMAC 60 divides a non-continuous link-list of cluster addresses from the logic address buffer 58 into a plurality of continuous sub-link-lists of cluster addresses, thus the DMAC 60 can configure each batch of DMA transmission according to each of the continuous sub-link-lists of cluster addresses without causing impact on the CPU 50.

Figure 2:
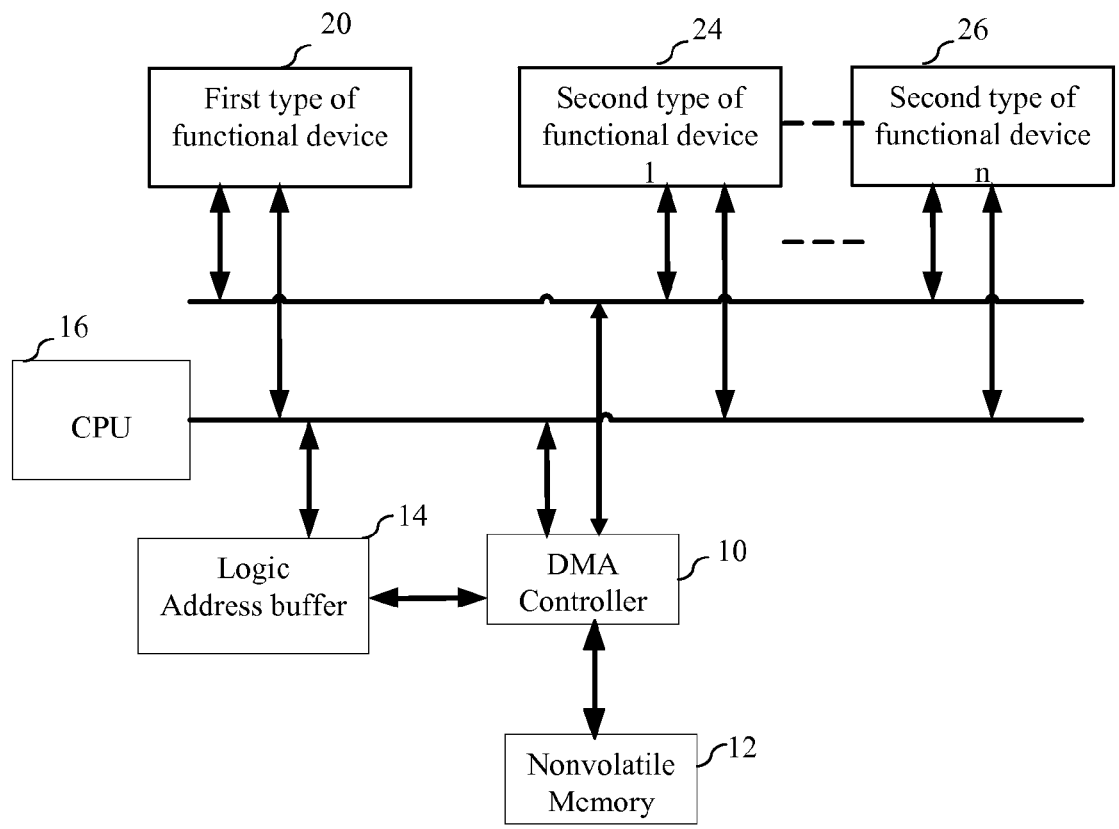
FIG. 2 is another exemplary application system of the DMAC according to one embodiment of the present invention.

As shown in FIG. 2, which is another exemplary application system of direct memory access controller (DMAC) according to one embodiment of the present invention, the application system comprises a central processor unit (CPU) 16 coupled to a data bus, a first type of functional device 20, such as a FAT accelerator, coupled to the data bus and a DMA bus, a plurality of second type of functional devices 24 and 26 such as a MP3 player, a WAV player and a Wave player etc. coupled to the data bus and the DMA bus, a logic address buffer 14 coupled to the data bus, a DMAC 10 according to one embodiment of the present invention and a nonvolatile memory 12 coupled to the DMAC 10. Each of the functional devices 24 or 26 is able to directly access the nonvolatile memory 12 via the DMAC 10. A respective DMA channel may be established when there is a DMA transmission between a functional device and the nonvolatile memory 12. In a sense, each of the functional devices 24 or 26 corresponds to one DMA channel.

The device 20 is referred to a device that can provide at least a general DMA channel parameter required in the DMA transmission to the DMAC. The general DMA channel parameter includes a logic address and a transmission length. The devices of the second type can not provide the DMA channel parameter to the DMAC so that the DMAC has to obtain the DMA channel parameter from the CPU 16 or the logic address buffer 14. It should be noted that the logic address provided by the device 20 should be continuous.

The following describes a specific operation of each functional module in FIG. 2 during a DMA transmission according to one embodiment. The CPU 16 assigns a continuous section in the logic address buffer 14 for each of the functional devices. The continuous section in the logic address buffer 14 stores a link-list of cluster addresses which is obtained from a FAT on the nonvolatile memory 12 and represents a region in the nonvolatile memory 14 accessible by a corresponding functional device. The CPU 16 is configured to initialize the DMAC and deal with abnormal conditions during the DMA transmission.

In one embodiment, a device (e.g., first type) is a file allocated table (FAT) accelerator which may be implemented in hardware and adapted for quickly obtaining a link-list of cluster address from the FAT in the nonvolatile memory 12 for corresponding to a functional device and storing the link-list of cluster address in a corresponding section in the logic address buffer 14. The detailed specification related to the FAT accelerator may be referred to a commonly assigned U.S. patent application Ser. No. 11/226,704, which is hereby incorporated by reference. Correspondingly, the contiguous ranges of the clusters in the link-list may be compressed into packed records, each including location information of a first cluster and length information of a contiguous range of clusters.

An example of the function devices may be a MP3 player, a WAV player and a Wave player etc. When a number of the devices require DMA transmission with the nonvolatile memory 14 at the same time, the DMAC is configured to handle the respective DMA transmissions with minimum impact on the CPU. In this situation, the FAT accelerator obtains corresponding link-lists of cluster address from the FAT in the nonvolatile memory 14 and stores the link-lists of cluster address in corresponding sections in the logic address buffer 14. It should be noted that the link-lists of cluster addresses may be non-continuous and also compressed into packed records before storing into the logic address buffer 14.

A divide unit provided in the DMAC 10 divides each of the link-lists of cluster addresses from the logic address buffer 14 into a plurality of continuous sub-link-list of cluster addresses, a length of which is less than a maximum allowed (cluster) number for the corresponding DMA channel. Hence, if a length is indeed longer than the maximum allowed number, such a long DMA transmission will be divided into a number of short sub-DMA transmissions. When a sub-DMA transmission corresponding to one DAM channel finishes, a sub-DMA transmission corresponding to another DAM channel starts, so that the sub-DMA transmissions of one DMA channels may be alternatively finished with the sub-DMA transmissions of other DMA channels. Thus, the DMAC is time division multiplexing by the DMA channels corresponding to the functional devices.

In a sense, the DMAC of the present invention can handle the DMA transmissions with minimum impact on the CPU. It should be noted that the maximum allowed cluster number of corresponding DMA channel is related to a maximum time of a corresponding DMA channel occupying the DMAC on each sub-DMA transmission. The maximum allowed cluster number may be preset according to an actual requirement.

Figure 3:
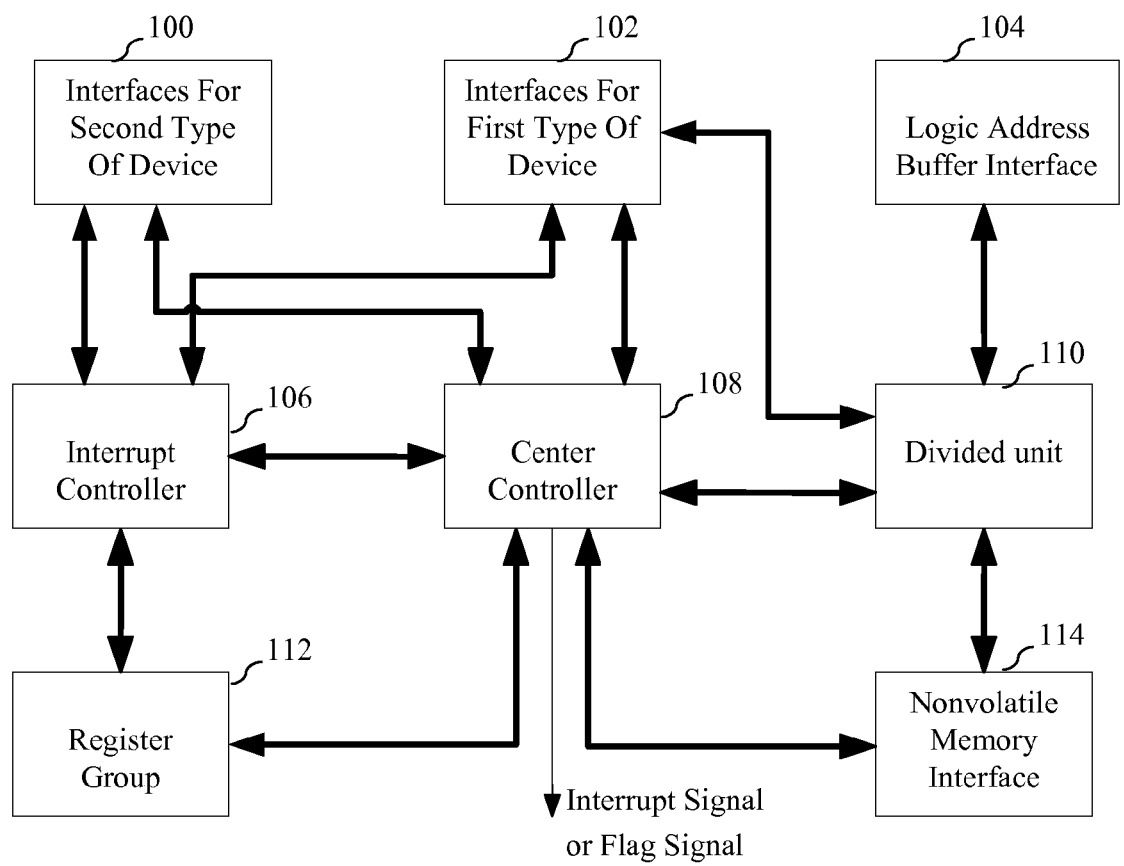
FIG. 3 is a functional block diagram showing the DMAC according to one embodiment of the present invention.

Referring to FIG. 3, which is a functional block diagram of the DMAC in one embodiment of the present invention. The DMAC includes a central controller 108, an interrupt controller 106, a register group 112, a divide unit 110, a plurality of interfaces 100 for the second type of functional devices, an interface 102 for a first type of functional device, a logic address buffer interface 104 for communicating with the logic address buffer 14, and a nonvolatile memory interface 114 for communicating with the nonvolatile memory 12.

The register group 112 provides a software interface to communicate with the CPU 16. The register group 112 includes a command register for storing commands coming from the CPU 16, a status register for storing status variables relative to the DMAC by reading which the CPU 16 can obtain status of the DMAC 10, and a parameter register for storing general DMA channel parameters required by a DMA channel. The general DMA channel parameters include a start address in the logic address buffer 104 assigned to a corresponding DMA channel, an offset, a transmission length and a transmission direction of the corresponding DMA channel. The offset parameters use Byte as its unit, such as 210 Byte. A cluster in the nonvolatile memory commonly includes one or two sectors, each of which contains 512 Byte. If the offset parameter is 210 byte, it refers that data starting from the 210th byte of a first cluster of the link-list of cluster address is what is required by this DMA transmission.

The divide unit 110 is provided to divide each of the link-lists of cluster addresses from the logic address buffer 14 into a number of continuous sub-link-lists of cluster addresses. A length of a sub-link-list is less than the maximum allowed cluster number for a corresponding DMA channel. As a result, a long DMA transmission may be divided into a number of batches of shorter sub-DMA transmissions. At the same time, the divide unit 110 can obtain a group of specific DMA channel parameters, each corresponding to one sub-DMA transmission from a continuous sub-link-list of cluster addresses. The group of parameter comprises a first cluster number from which a first one sub-DMA transmission starts, and a transmission length of the one sub-DMA transmission. The maximum allowed cluster number is a transmission maximum value during each sub-DMA transmission for the corresponding DMA channel.

It can be observed that the division is performed with two rules, the first rule is that the length of each sub-link-list of cluster addresses must be less than the maximum allowed cluster number; and the second rule is that each sub-link-list of cluster addresses must be continuous. As mentioned above, the accessing address of the first type of device is continuous. For an example, it assumes that a link-list of cluster addresses is 12, 13, 14, 15, 16 (continuous) and a maximum allowed cluster number for the first type of device is 3. Accordingly the first cluster number of the first sub-DMA transmission is 12, and the transmission length of the first sub-DMA transmission is 3 while the first cluster number of the next sub-DMA transmission is 15, and the transmission length of the next sub-DMA transmission is 2. If it assumes that the maximum allowed cluster number is 6, so the first cluster number of the first sub-DMA transmission is 1, and the transmission length of the first sub-DMA transmission is 5. For another example relative to the second type of device, it assume that the link-list of cluster address is 12, 13, 14, 15, 16, 17, 19, 20, 21, 22 (non-continuous), and the maximum allowed cluster number for the second type of device is 5. Accordingly, a first cluster number of a first sub-DMA transmission is 12, and the transmission length of the first sub-DMA transmission is 5 while the first cluster number of a second sub-DMA transmission is 17, and the transmission length of the second sub-DMA transmission is 1 (because the discontinuity). The first cluster number of a third sub-DMA transmission is 19, and the transmission length of the third sub-DMA transmission is 4. It should be noted that if the offset parameters in the register group 112 is larger than 512 Byte, the first cluster of the first sub-DMA transmission should be moved backwardly.

When the functional device requires one DMA transmission with the nonvolatile memory, the functional device should send an interrupt request with priority level information to the interrupt controller 106 via the corresponding interface. The interrupt controller 106 decides which DMA channel is going to be served depending on the priority level of the interrupt request, and also decides the time to propose the interrupt request to the central controller 108.

In one embodiment, the interrupt controller 106 is configured with an interrupt response strategy which is in accordance with the following principles. The first is that if the interrupt requests having different priority levels are received simultaneously, the higher one goes firstly. The second is that the interrupt request with lower priority level is interrupted by a higher one. The third is that if the interrupt requests have the same priority level information, the DMAC 10 switches the DMA channels orderly so that the respective sub-DMA transmissions of one DMA channels are alternatively finished with the sub-DMA transmissions of other DMA channels.

The priority level of each interrupt request is preset by the CPU 16 in initialization. The interrupt request may either come from the functional devices which are called a hardware interrupt or comes from the CPU which is called a software interrupt. A central controller 108 is provided for controlling and operations of every module in the DMAC. The state machine 400 of the center controller 108 shown in the FIG. 4, includes IDLE 402, LOAD 404 Pr_RD 406, RD 408, RD_J 410, RD_WT 412, RD_E 414, Pr_WR 416, WR1 418, WR2 420 WR_J 422, WR_WT 422 and WR_E 424 wherein:

The IDLE state 402 represents an idle state under which, when receiving one interrupt request from the interrupt controller, it goes into the LOAD state 404.

Under the LOAD state 404, dividing the DMA transmission is executed to produce a number of specific DMA channel parameters, each group corresponding to one sub-DMA transmission. If the interrupt request aims for reading, the next state is the Pr_RD 406; and if the interrupt request aims for writing, the next state is Pr_WR 416.

Under the Pr_RD state 406, it makes a reading request to the nonvolatile memory interface 114. When the nonvolatile memory 12 replies a response, it enters the RD state 408.

Under the RD state 408, the sub-DMA transmission starts, data is transmitted from the nonvolatile memory to the functional device according to a corresponding group of specific DMA channel parameters. When the sub-DMA transmission finishes, it enters the RD_J state 410.

Under the RD_J 410, it judges whether the whole DMA transmission is finished or not. If YES, it enters the RD_Estate 414; otherwise, it enters the RD_WT state 412.

Under the RD_WT state 412, it waits for a data signal of the nonvolatile memory interface 114 and a buffer signal of the functional device. When both of them are effective, it enters the RD state 408.

Under the RD_E state 414, it does some finishing operations, such as refreshing the status register in the register group 112. Then, it returns to the IDLE state 402.

Under the Pr_WR state 416, it makes a writing request to the nonvolatile memory interface 114, when the nonvolatile memory 12 replies a response, it enters the WR1 state 418.

Under the WR1 state 418, the sub-DMA transmission starts, data is transmitted from the functional device interface to the nonvolatile memory interface. When the sub-DMA transmission finishes, it enters the WR2 state 420.

Under the WR2 state 420, the nonvolatile memory interface 114 writes the received data into the nonvolatile memory according to corresponding group of specific DMA channel parameters. When finished, it enters the WR_J state 424.

Under the WR_J state 424, it judges whether the whole DMA application is finished or not. If YES, it enters the WR_E state 426, otherwise, it enters the WR_WT state 422.

Under the WR_WT state 422, it waits for a data signal of the functional device and a buffer signal of the nonvolatile memory interface 114. When both of them are effective, it enters the WR1 state 418.

Under the WR_E state 426, it does some finishing operations, such as refreshing the status register in the register group 112. Then, it returns to the IDLE state 402.

The interruption response time sequence rule is:

for an interrupt request with higher priority level which needs to be executed immediately, when the state machine locates at any state of reading operation, the next state comes into the RD_E state 414, when the state machine locates at any state of writing operation, the next state comes into the WR_Estate 426;

for an interrupt request with the same priority which needs to share the BUS bandwidth by time division way, when the state machine locates at the RD_J state 410, the next state comes into the RD_F state 414, when the state machine locates at the WR_J 424 the next state comes into the WR_E state 426.

When exchanging data via the DMAC controller according to one embodiment of the present invention, it executes the following operations. Firstly, the CPU 16 initiates the general DMA channel parameter. The general DMA channel parameter includes the maximum allowed cluster number, the prior level of interrupt request and the transmission direction (reading or writing). For the second type of functional device, the general DMA channel parameter further comprises the start address in the logic address buffer 104 assigned to a corresponding DMA channel, the offset, the transmission length. Secondly, the DMAC receives an interrupt request for corresponding DMA channel. The interrupt request could be either the hardware interrupt from the functional devices or the software interrupt from the CPU. Thirdly, the interrupt controller 106 decides the time to response the interrupt request according to the interrupt response strategy. When the DMAC controller decides to serve for this DMA channel, it enters the DMA transmission operation. In the DMA transmission operation, the divide unit 110 divides the whole DMA transmission into a plurality of sub-DMA transmissions according to the division rules and obtains a number of specific DMA channel parameters, each group corresponding to one sub-DMA transmission, then, the DMAC executes the sub-DMA transmission in an order until the whole DMA transmission finishes.

Figure 4:
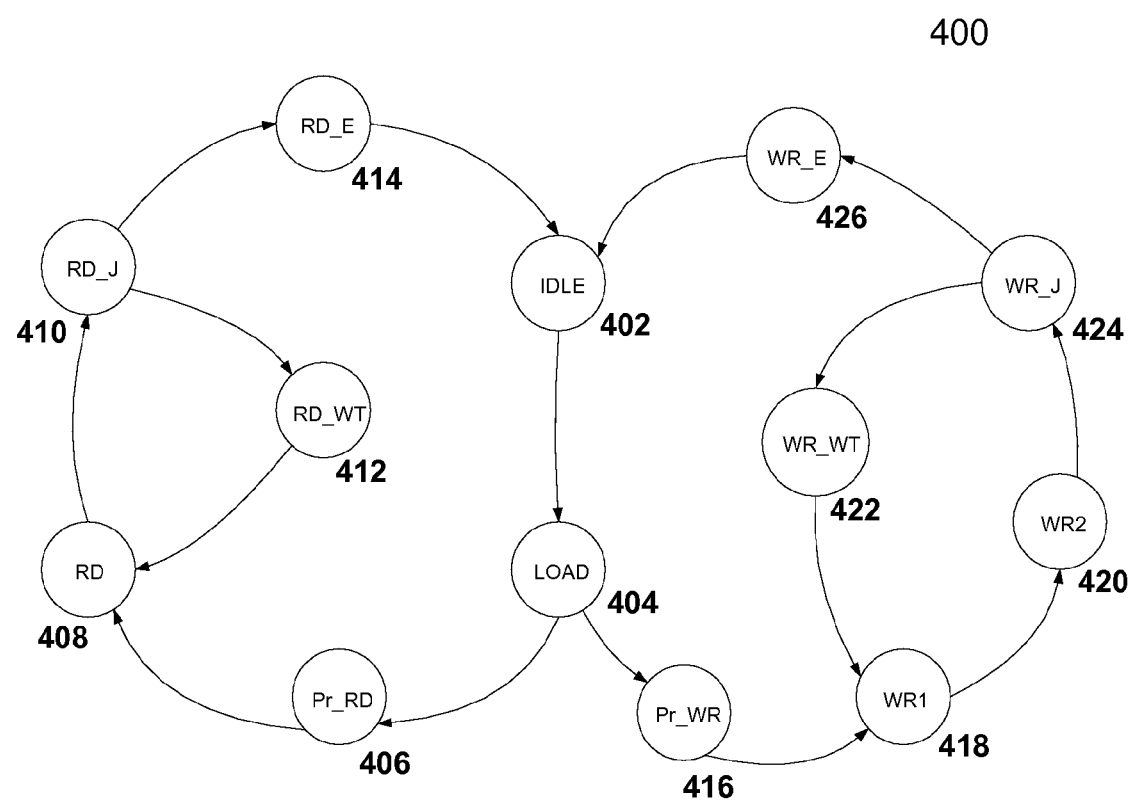
FIG. 4 is a flowchart showing a state machine of the DMAC according to one embodiment of the present invention.

In conjunction with the state machine shown in FIG. 4, the DMA transmission between the nonvolatile memory 12 and a functional device is specifically described in view of FIG. 3 involving a reading operation and a writing operation. The operation may also be understood as a state machine. The DMAC is under the IDEL state 402, it waits for an operation command.

After receiving the operation command, the DMAC enters the LOAD state 404. At the LOAD state 404, the DMAC obtains a target device and a source device of this DMA transmission, and divides the DMA transmission to produce a number of specific DMA channel parameters, each group corresponding to one sub-DMA transmission. At the same time, the DMAC judges whether the operation command is the reading command or the writing command. If it is the reading command, it enters the Pr_RD state 406, otherwise, it enters the Pr_WR state 416.

At the Pr_RD state 406, the DMAC makes a reading request containing one group of specific DMA channel parameters to a memory controller of the nonvolatile memory serving as the source device, the memory controller reads out data from the nonvolatile memory into an inner RAM thereof according to the one group of specific DMA channel parameter. A response signal from the memory controller is then returned, and the DMAC enters the RD state 408.

The memory controller transmits the data stored in the inner RAM to a FIFO buffer of a target device (e.g., an MP3 player) directly through the DMA BUS under the control of the DMAC. When finished, the DMAC enters the RD_J state 410 where the DMAC judges whether the data of the reading operation is completely transmitted. If no, it enters the RD_WT state 412. When the DMAC enters the RD_WT state, where it picks out a next group of specific DMA channel parameter to the memory controller, the memory controller reads out the data from the nonvolatile memory according to the next group of specific DMA channel parameter. It is assumed that the DMA data transmission between the target device and the nonvolatile memory is complete, the DMAC returns to the RD_J state 410. The DMAC next enters the RD_E state 414, refreshes the status parameters of the register group 112 and sends an interrupt signal to the CPU, the reading operation to the nonvolatile memory is finished and returning to the IDLE state 402.

At the Pr_WR state 416, the DMAC makes a writing request containing one group of specific DMA channel parameter to the controller of the nonvolatile memory, when the memory controller is ready, and sends a response signal. If the signal representing transmission data of the target device is effective, it is taken to the WR1 state 418. The memory controller reads the data from the FIFO buffer of the target device through the DMA BUS into the inner RAM thereof under the control of the DMAC, when finished, the DMAC enters the WR2 state 420.

The storage controller writes the data in the inner RAM thereof into the nonvolatile memory according to the one group of specific DMA channel parameter, while the data has been completely written, it enters the WR_J state 424. The DMAC judges whether the data of the writing operation is completely transmitted. If yes, the DMAC enters the WR_WT state 422 to pick out the next group of specific DMA channel parameter to the memory controller. If the signal representing the memory controller is ready and the signal representing the MP3 player being ready is effective at the same time. The DMAC enters the RD_E state 414, refreshes the status parameters of the register group 112 and sends an interrupt signal to the CPU, the writing operation to the nonvolatile memory is finished.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A direct memory access (DMA) controller for transmitting data between a first device and a second device, the DMA controller comprising:
   a central unit;
   a logic address buffer caching a link-list of cluster addresses obtained from a file allocated table (FAT) in a nonvolatile memory;
   a divide unit dividing the link-list of cluster addresses into a plurality of sub-link-lists of cluster addresses according two requirements each of the sub-link-lists of cluster addresses being continuous and a length of the sub-link-lists of the cluster addresses being less than a maximum allowed cluster number in length for a corresponding DMA transmission; and
   an interrupt controller to receive an interrupt request with priority level information from the first device to have the DMA transmission with the second device and to decide which DMA channel is going to be served depending on the priority level of the interrupt request;
   wherein the central unit is caused to configure the DMA transmission between the first and second devices into a number of batches of sub-DMA transmissions, each of the batches corresponding to one of the sub-link-lists of cluster addresses, as a result, the batches of sub DMA transmissions according to the continuous sub-link-lists of cluster addresses proceed without causing impact on a CPU in the source device.

2. The DMA controller as claimed in claim 1, wherein, when there are two or more DMA transmissions required to be processed, the sub DMA transmissions are finished in an order.

3. The DMA controller as claimed in claim 1, wherein, there is a maximum length for a sub DMA transmission, a length in each of the sub-link-lists of cluster addresses is less than or equal to a maximum cluster number.

4. The DMA controller as claimed in claim 1, wherein the link-list of clusters is compressed into packed records, each including location information of a first cluster and length information of a contiguous range of clusters thereof before being buffering into the logic address buffer.

5. The DMA controller as claimed in claim 1, wherein the sub-DMA transmissions finished by turns have a same prior level.

6. The DMA controller as claimed in claim 1, wherein the divide unit further obtains a group of DMA channel parameters corresponding to one sub-DMA transmission from each of the continuous sub-link-lists of cluster addresses, and wherein the group of DMA channel parameter includes a first cluster number from which the one sub-DMA transmission starts, and a transmission length of the one sub-DMA transmission.

7. The DMA controller as claimed in claim 1, wherein the interrupt controller is for deciding which DMA transmission is going to be served and deciding when to propose an interrupt request to the central controller.

8. The DMA controller as claimed in claim 1, further comprising a register group providing a software interface communicating with a center processor unit.

9. A direct memory access (DMA) controller for transmitting data between a first device and a second device, the DMA controller comprising:
   an interface to communicate with a FAT accelerator to obtain corresponding link-lists of cluster addresses from a FAT in a nonvolatile memory;
   a logic address buffer for storing the link-lists in corresponding sections;
   a divide unit dividing each of the link-lists into a plurality of continuous sub-link-lists of cluster addresses, a length of which is less than a maximum allowed number for a corresponding DMA transmission, wherein, if a length is indeed longer than the maximum allowed number, a long DMA transmission is divided into a number of sub-DMA transmissions; and
   an interrupt controller to receive an interrupt request with priority level information from the first device to have a DMA transmission over the corresponding DMA channel with the second device and to decide which DMA channel is going to be served depending on the priority level of the interrupt request,
   wherein a sub-DMA transmission corresponding to one DMA channel finishes, a sub-DMA transmission corresponding to another DMA channel starts, so that the sub-DMA transmissions of one DMA channels is alternatively finished with the sub-DMA transmissions of other DMA channels.

* * * * *